Patented Sept. 29, 1931

1,825,065

UNITED STATES PATENT OFFICE

ARTHUR B. HOWELL, OF NEW YORK, N. Y., ASSIGNOR TO DRYICE EQUIPMENT CORPORATION, OF NEW YORK, N. Y., A CORPORATION OF DELAWARE

TREATMENT AND PRESERVATION OF CUT PLANTS

No Drawing. Application filed August 30, 1929. Serial No. 389,609.

This invention relates to the preservation and treatment of plants, especially cut plants, such as roses, carnations, sweet peas, plumosus, etc.

The objects are to supply methods and means whereby the life of the plants, after they have been cut, is lengthened from two to three times, and in some instances even longer, beyond what it would be if they were treated by the standard practices of today. Another object of the invention is to revive plumosus, also known as asparagus fern, that has already dried out to a degree that renders it of little or no commercial value.

By nature, flowers and ferns are very delicate and if exposed to normal temperatures, after having been cut, for only comparatively short periods they will wilt and die, but it is highly desirable, from the commercial viewpoint, to keep them fresh as long as possible, and to do this, refrigeration must be resorted to. The temperature generally necessary to be maintained for this purpose is about 50° F.

It has been quite difficult and expensive to preserve the freshness of flowers when shipping them by the present standard practices, which usually consist in placing water ice in the center of a box, or container, to supply both moisture and cold, the plants then being placed in each end of the box. The temperature in the center of the box, that is, next to the ice, is generally around 35° F., while the temperature in the ends of the box is oftentimes as high as the outside temperature.

I have discovered methods of treating plants, to lengthen their lives, that are far superior in efficiency to the methods in use at present and when used in conjunction with refrigeration, when the latter is found necessary, there will be an increase in the life of the plant of from 100% to 200% over that when refrigeration is used alone.

The bad features of shipping articles packed with water ice are too well known to need enumeration here, but by my methods, I obtain the increased efficiency as indicated above and in the case of shipping plumosus, I entirely obviate the necessity of using refrigeration, and even with other plants the advantages of my methods are so far superior to those now in use that I obtain for the plants, without refrigeration, a life that is longer than when refrigerated under present methods.

My discovery involves the use of solid $CO_2$, the same to supply both $CO_2$ gas, and refrigeration where necessary.

I have found that if plants are held at about 50° F. and in an atmosphere containing about 30% concentration of $CO_2$ gas, they will keep for approximately three times as long as they would if treated according to standard practice. This temperature and percentage concentration of $CO_2$ gas renders the maximum of efficiency; however, the results vary only slightly when the percentage concentration of $CO_2$ gas is anywhere from 20% to 40%, this being the range of maximum efficiency.

Sweet peas, carnations and roses are representative of flowers and the results obtained with them are a reliable indication of the results to be obtained with flowers generally, so, for this reason, I will cite the results obtained from treating the above-named flowers in accordance with my discovery. With a temperature of 50° F. and 30% $CO_2$ gas atmosphere, the total life of the sweet peas was approximately two-thirds longer than it would have been if treated under standard methods; the life of carnations was a little less than three times as long; and the life of roses was a little more than twice as long. These results show conclusively the superiority of my methods.

At higher temperatures, the difference in the life of the flowers is not as pronounced as those listed above, but the results do indicate beyond a doubt that at normal temperatures, say 75° F., and in a 30% $CO_2$ gas atmosphere, the total life of flowers is prolonged to a very surprising degree; for example, the life of carnations at this temperature is prolonged about three-fourths more than it would be if kept at the same temperature and in an atmosphere of air. The same is true of sweet peas. The life of roses under these conditions is increased approximately two-thirds.

The experiments have shown further that $CO_2$ gas will to a marked degree prolong the life of the flowers when the concentration is anywhere up to 90%; however, above this point the difference in the duration of life, as compared to that in air, is very slight and as the $CO_2$ gas concentration approaches 100%, the life becomes slightly shorter, until at 100% the life of the flowers is just slightly less than it would be if they were kept in air.

As before stated, in the $CO_2$ gas treatment of plumosus, the results vary slightly from those obtained with flowers. It is desirable that a higher percentage concentration of $CO_2$ gas be used to obtain the maximum of efficiency than is used with flowers. When the plumosus is held in an atmosphere of 30%, or upward, $CO_2$ gas concentration and kept moist, it will live longer than when kept in air and at a refrigerating temperature. While 100% $CO_2$ gas atmosphere will not lengthen the life of flowers, it has a decided beneficial effect on plumosus. For example, a plumosus plant that has dried out or deteriorated to a point where it is of no commercial value may be placed in 100% $CO_2$ moist gas atmosphere, at room temperature, and it will revive and keep almost as long as would a freshly cut plant.

In all my experiments and comparisons made herein, the same conditions obtain with both the old methods and my methods except for the $CO_2$ gas concentration, i. e., in both cases I used the same flowers, the same humidity and same temperature, varying only the $CO_2$ gas concentration.

Throughout the specification and claims I have used the word "plant" in a broad sense, meaning, flowers, buds, slips, ferns and other vegetation of similar character. By "cut" I mean those plants that have been separated from their roots or the main body of the plant.

I claim:

1. The herein described method of treating cut plants which consists essentially in supplying them with moisture while holding them in an atmosphere containing less than a 90% concentration of $CO_2$ gas and more than a 5% concentration of $CO_2$ gas.

2. The herein described method of treating cut plants which consists essentially in supplying them with moisture while holding them in an atmosphere containing more than a 5% concentration of $CO_2$ gas but less than a 90% concentration of $CO_2$ gas and at a refrigerating temperature.

3. The herein described method of treating cut plants which consists essentially in supplying them with moisture while holding them in an atmosphere containing between 20% and 40% concentration of $CO_2$ gas.

4. The herein described method of treating cut plants which consists essentially in supplying them with moisture while holding them in an atmosphere containing between 20% and 40% concentration of $CO_2$ gas and at a refrigerating temperature.

5. The herein described method of treating cut plants which consists essentially in supplying them with moisture while holding them in an atmosphere containing approximately a 30% concentration of $CO_2$ gas.

6. The herein described method of treating cut plants which consists essentially in supplying them with moisture while holding them in an atmosphere containing approximately a 30% concentration of $CO_2$ gas and at a temperature between 50° F. and their freezing point.

7. The herein described method of treating cut plumosus which consists essentially in supplying them with moisture while holding it in an atmosphere containing substantially 100% concentration of $CO_2$ gas.

8. The herein described method of treating cut plumosus which consists essentially in holding said plumosus in a dark, cool moist atmosphere containing $CO_2$ gas.

9. The herein described method of treating cut plumosus which consists essentially in holding said plumosus in a moist atmosphere containing a higher concentration of $CO_2$ gas than 30%.

10. The herein described method of treating dried out cut plumosus for the purpose of reviving it, consisting essentially of holding the plumosus in a moist and substantially 100% $CO_2$ gas atmosphere.

11. The herein described method of treating dried out cut plumosus for the purpose of reviving it, consisting essentially of holding the plumosus in a moist atmosphere containing more than 30% $CO_2$ gas and at normal temperature.

12. The herein described method of treating cut plants which consists essentially in supplying them with moisture while subjecting them to an atmosphere consisting of air containing an abnormal percentage of $CO_2$ gas.

13. The herein described method of treating cut plants which consists essentially in supplying them with moisture while subjecting them to an atmosphere containing $CO_2$ gas in much greater percentage than atmospheric air, and at a refrigerating temperature.

Signed at Chicago, in the county of Cook, and State of Illinois, this 23 day of August, A. D. 1929.

ARTHUR B. HOWELL.